Figure 1:
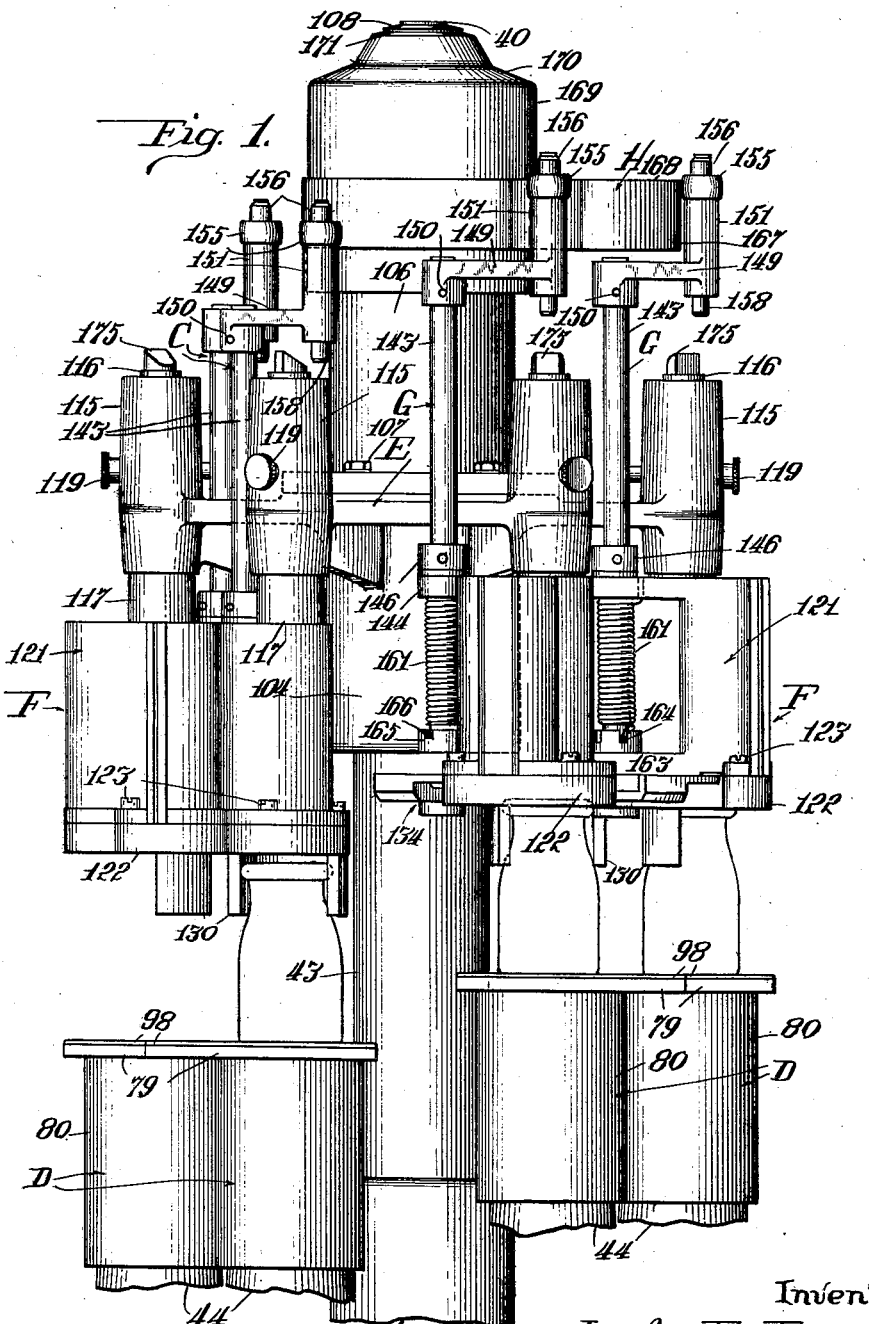

Inventors
Lewis E. Fagan
and Albert B. Mojonnier
By Thomas H. Ferguson
Attorney

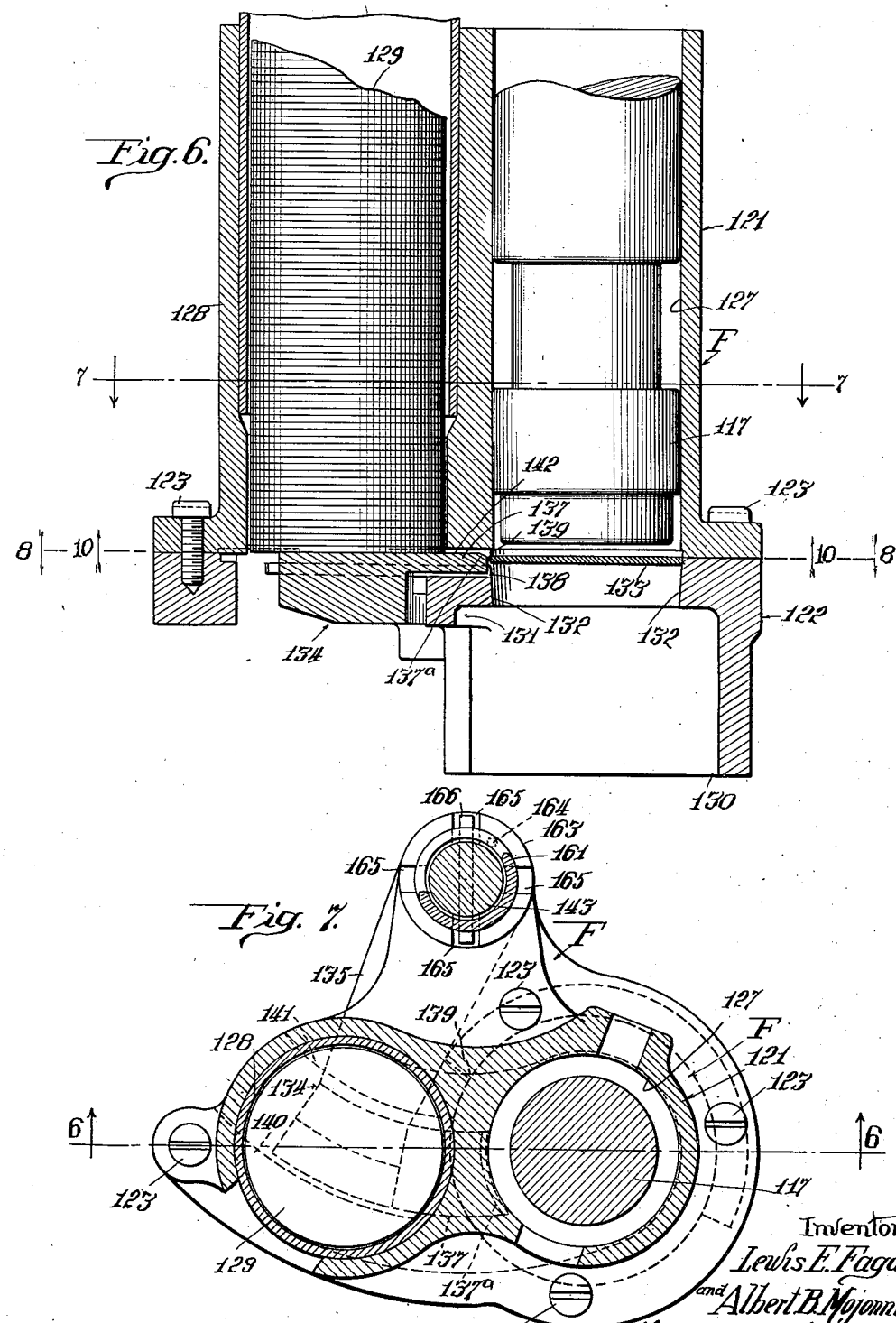

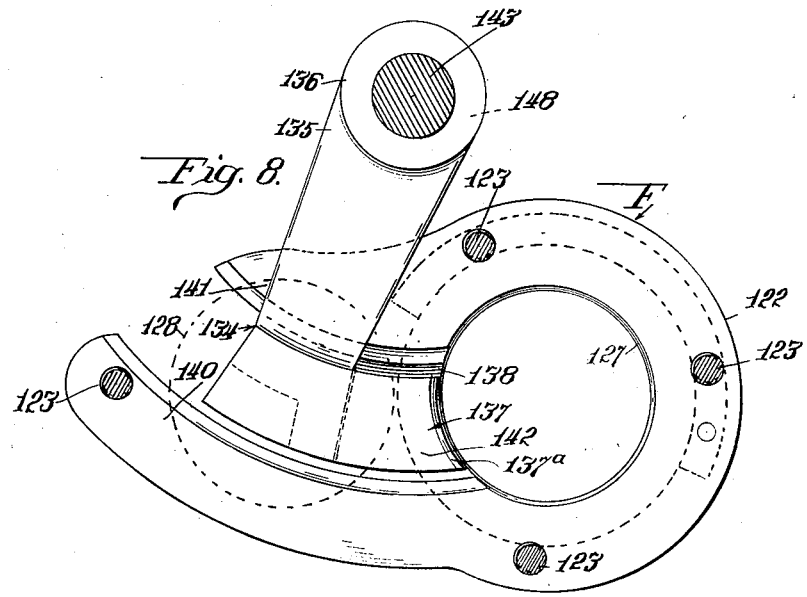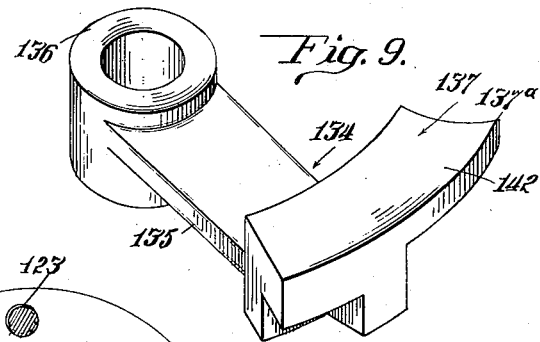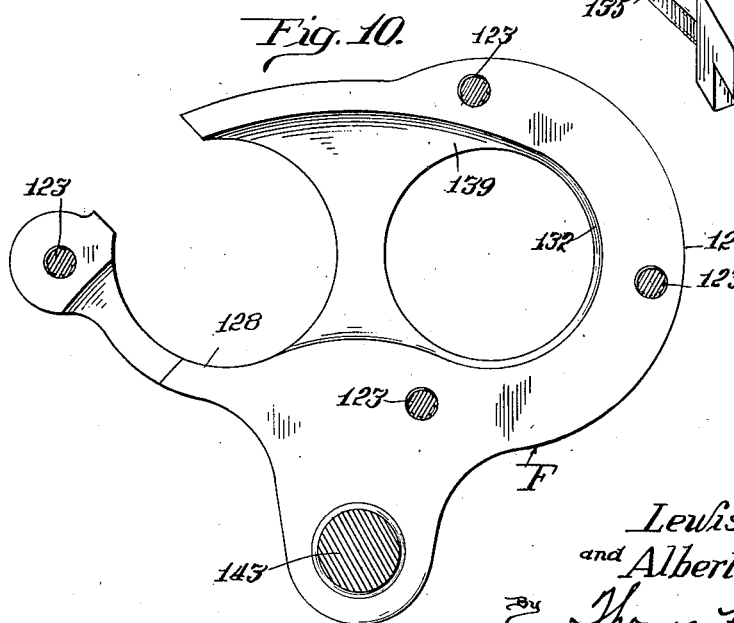

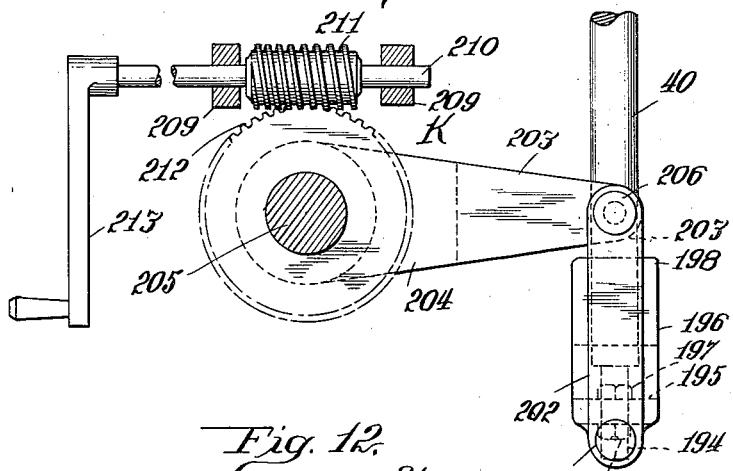
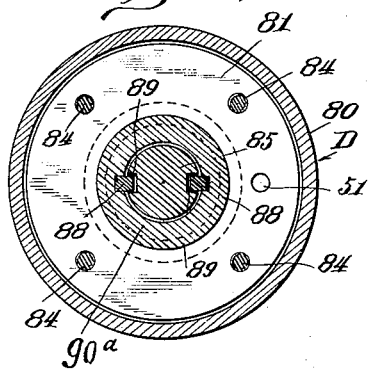
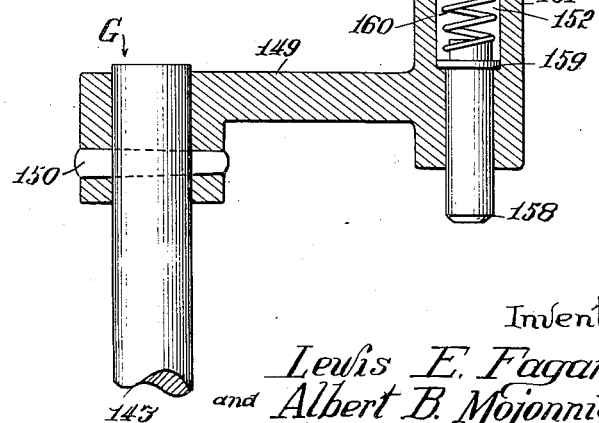

Feb. 26, 1935.  L. E. FAGAN ET AL  1,992,693
BOTTLE CAPPER
Filed Nov. 2, 1932  10 Sheets-Sheet 8
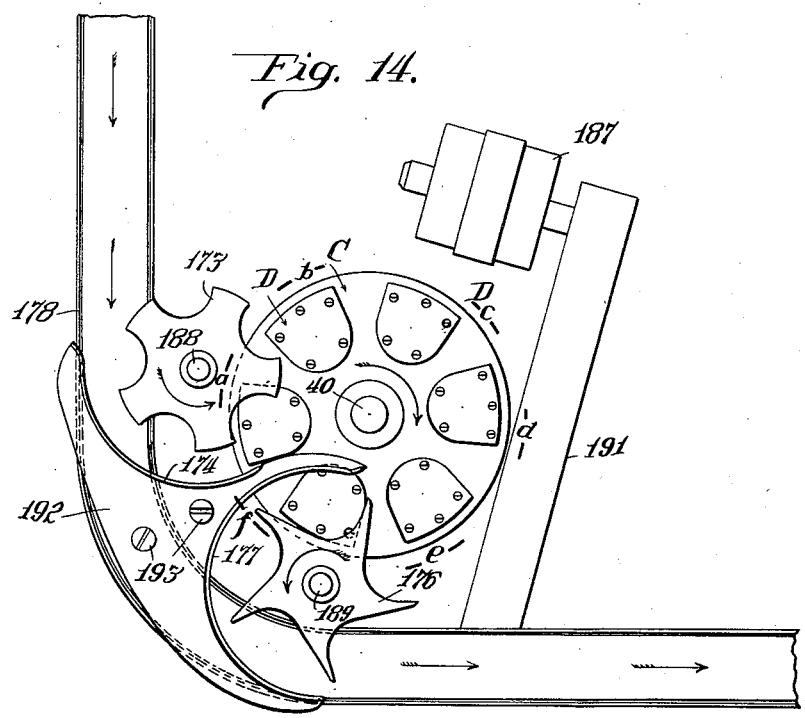
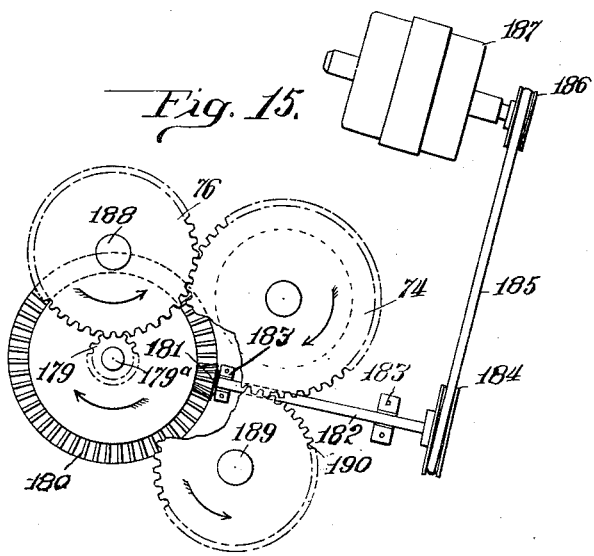
Inventors
Lewis E. Fagan
and Albert B. Mojonnier
By Thomas H. Ferguson
Attorney

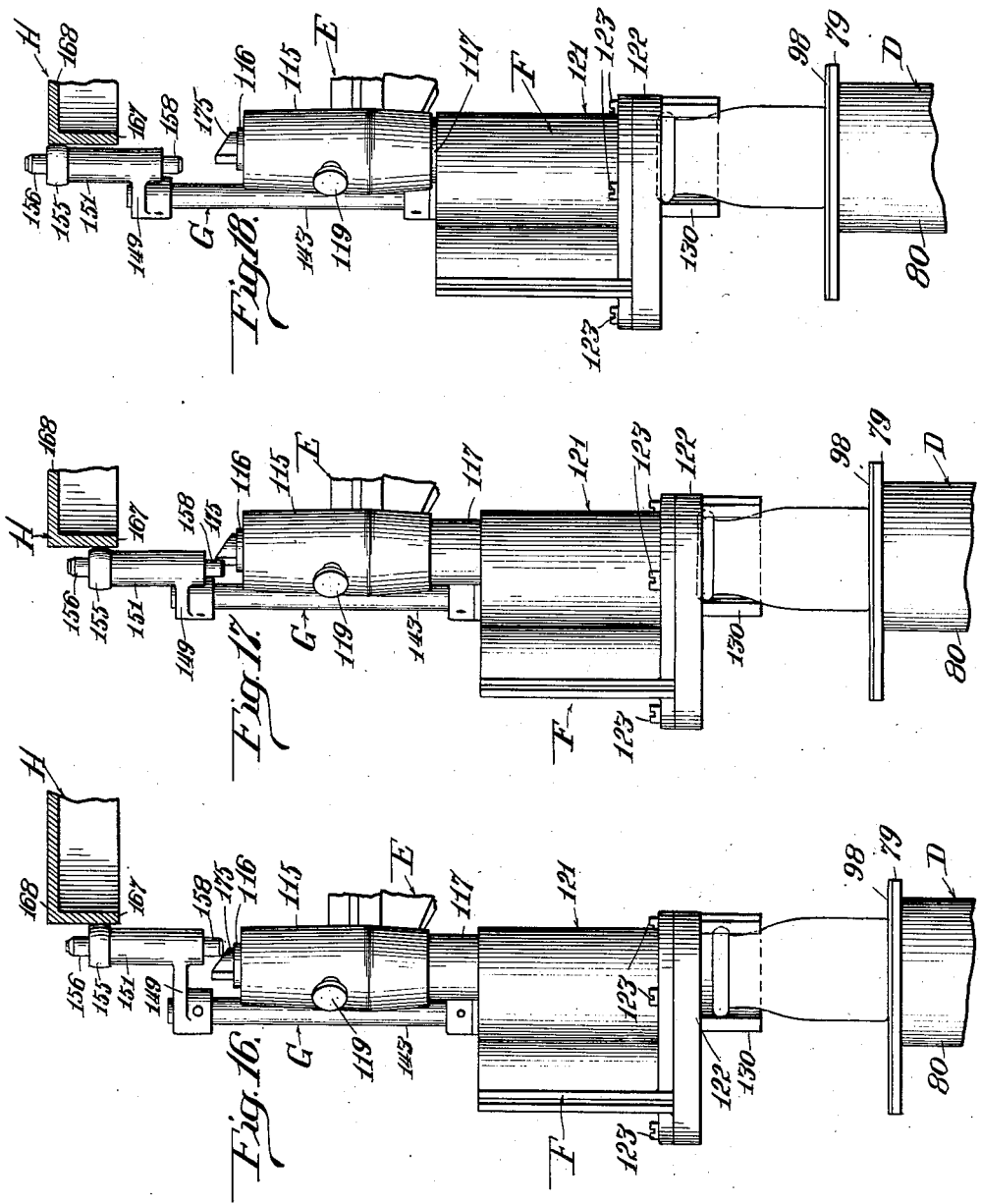

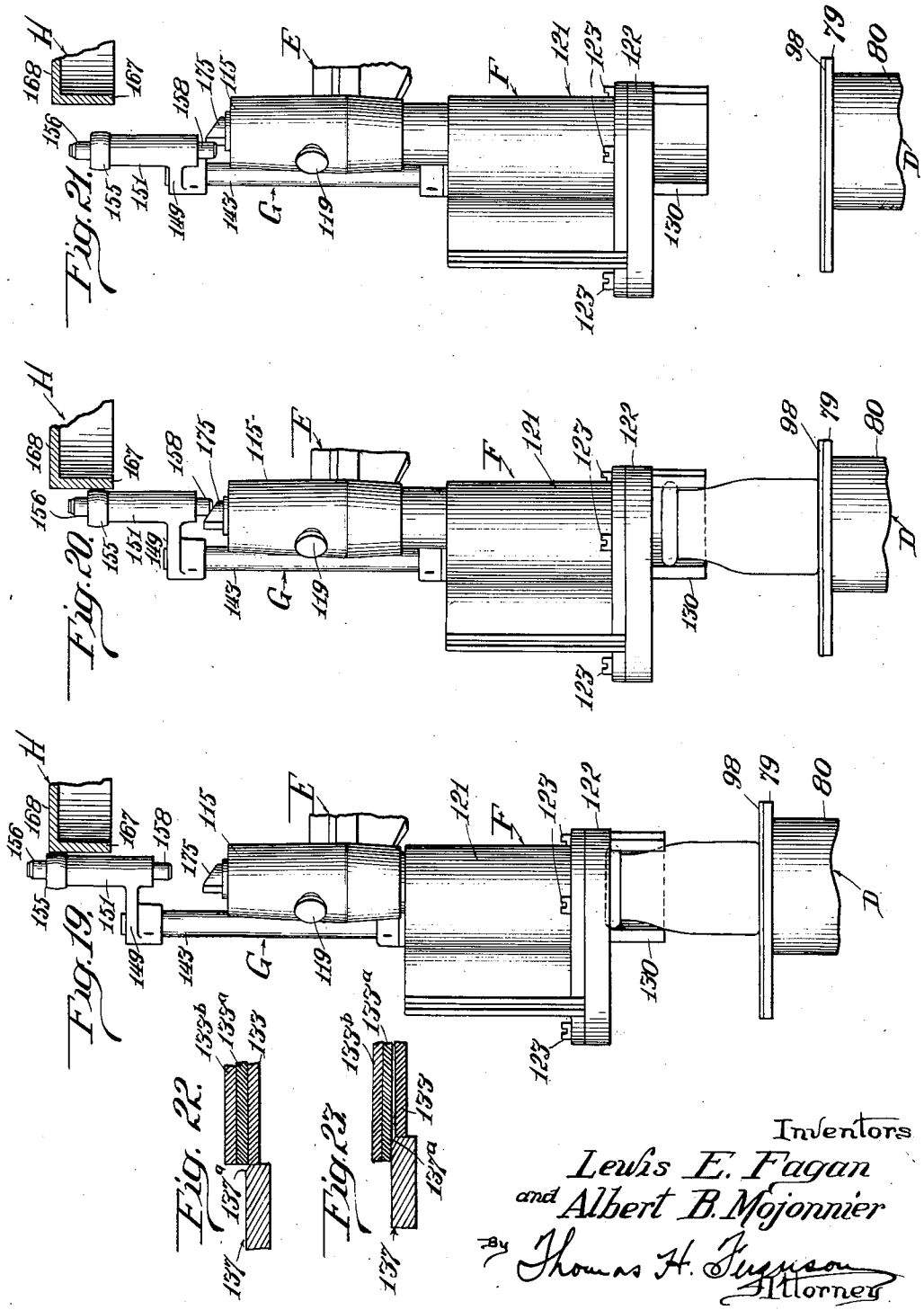

Patented Feb. 26, 1935

1,992,693

UNITED STATES PATENT OFFICE 1,992,693

BOTTLE CAPPER

Lewis E. Fagan, Chicago, and Albert B. Mojonnier, River Forest, Ill., assignors to Mojonnier Bros. Co., a corporation of Illinois Application November 2, 1932, Serial No. 640,832

27 Claims. (Cl. 226—92)

The present invention relates to bottle cappers and more particularly to cappers for applying closing disks to milk bottles, although in some instances the novel features may have a broader application than this. However, since the invention has been developed more particularly with reference to the capping of milk bottles, the disclosure will be set forth along these lines.

One object of the invention is to provide capper elements of simple construction and such that they may be readily removed from their supporting parts for cleaning. To this end the different elements are made easily separable and all passages and channels are made substantially rectilinear so that cleaning brushes and other like implements may be readily applied to the interior surfaces in order to properly clean the same.

Another object is to provide a capper which shall quickly and accurately apply the caps and do so with a minimum of spillage of the liquid being filled into the bottles. This requires an even and regular movement of the bottle and of the parts that contact with it in the capping operation.

Another object is to provide a capper in which the bottle will be given a minimum lift in the operation of the parts during the capping operation.

Another object is to provide a capper in which the cap will at first be brought into a position approximating its final position by means of the application of air under low pressure and then finally forced into its ultimate position by the application of air under high pressure.

Another object is to so arrange the cap magazines in relation to the other parts and to so rate their speed of operation that the reloadings of the magazines will be reduced to a minimum.

Another object is to provide a novel construction in which the bottle lifters may be accurately and easily adjusted to suit the height of the conveyer from which the bottles are received and in which also the capper elements may be readily and quickly adjusted above the lifters to suit bottles of different heights.

Another object is to provide for a novel adjustment of the bearing member for the lifter carrier, through which air is supplied to the lifters during the capping operations. The bearing member and carrier, by reason of the grooves and ports in their contacting faces, serve as a distributing valve for distributing compressed air to the lifters when they are to be raised and for removing it by opening an exhaust passage to atmosphere for them, whenever they are to be lowered, all in proper timed relation with the movements of the capping elements proper.

Another object is to provide a capper capable of long and continued wear with a minimum of attention and repair.

Another object is to provide a novel flipper or cap advancing blade that will sufficiently separate a selected cap from the other caps with which it is associated in the magazine so that there will be fewer failures in feeding the caps. The separation thus provided is especially important where the caps include pieces of wire in their construction, as, for example, where tabs are secured to the disk by a staple of wire or by wire stitching. By the novel construction, a beveled edge passes under the wire without catching into it and producing a false feeding of the cap.

These and other objects, features and advantages of our invention will be more fully understood upon reference to the following detailed description taken in connection with the accompanying drawings and the scope of the invention will be particularly pointed out in the appended claims.

The embodiment of the invention herein contained is especially suited to cooperation (1) with the filler head set forth in application Serial No. 614,474, filed May 31, 1932, by Lewis E. Fagan, one of the inventors herein, and issued as Patent No. 1,929,736, dated October 10, 1933, and (2) with the general filling machine arrangements set forth in our joint application Serial No. 643,132, filed November 18, 1932, and issued July 17, 1934, as Patent No. 1,966,889.

Figure 2:
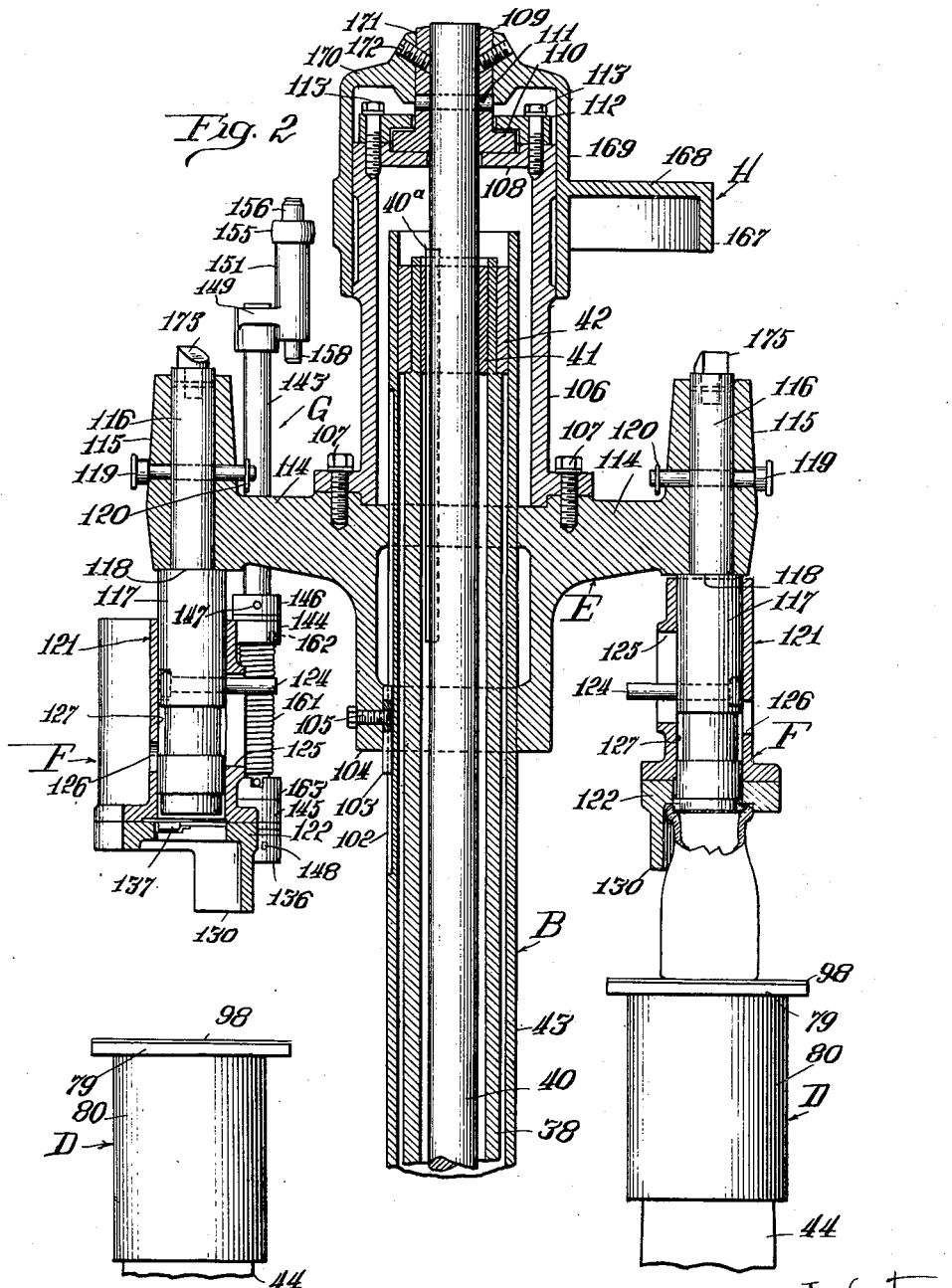
Figure 3:
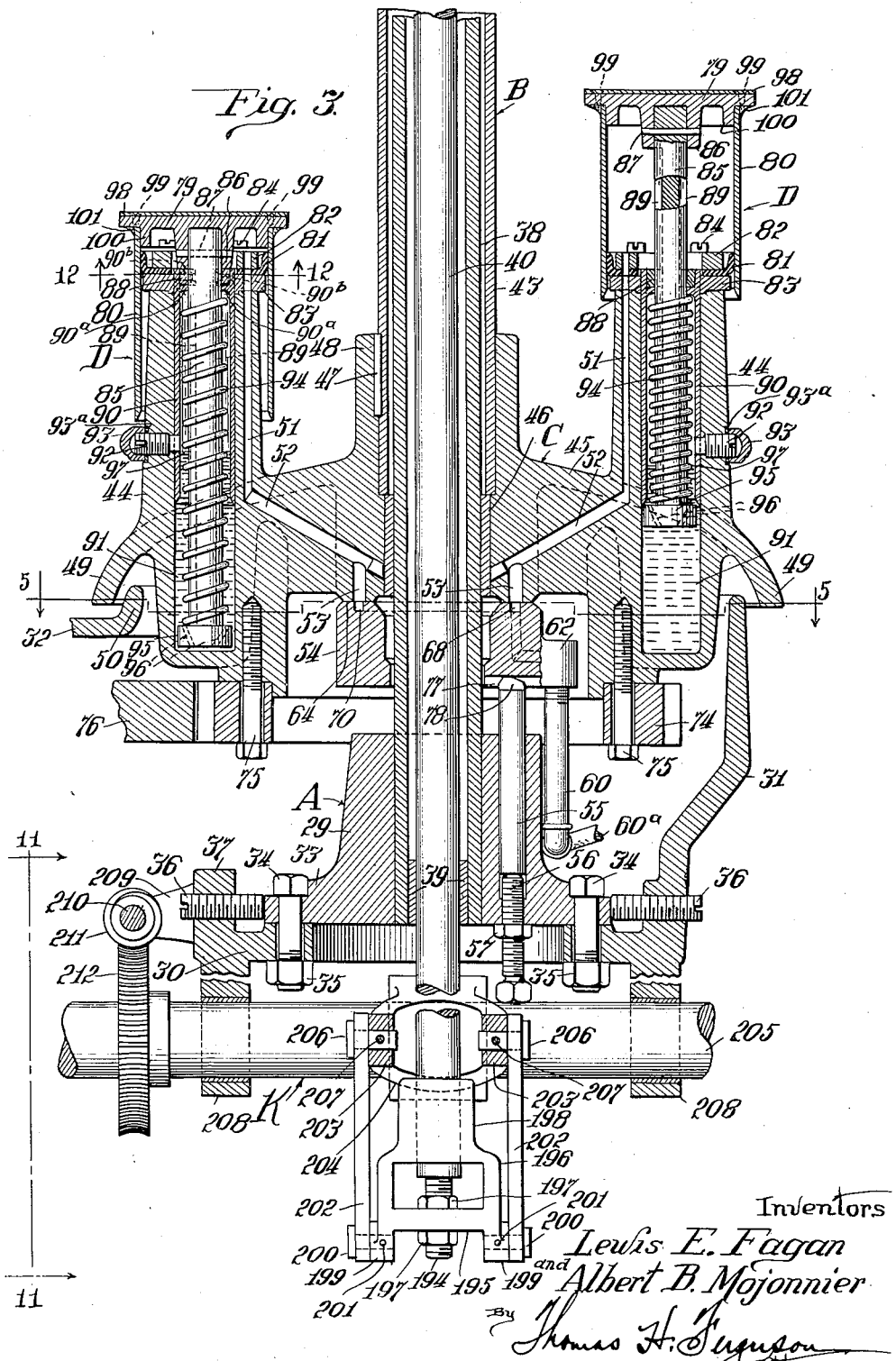
Figure 4:
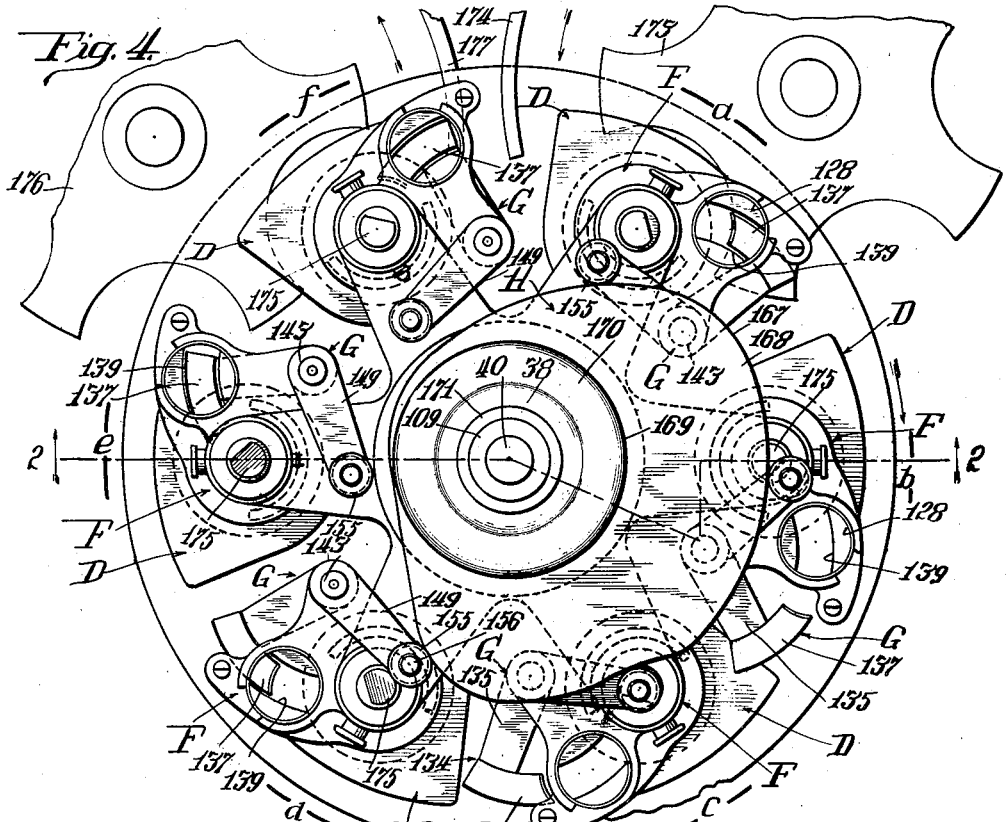
Figure 5:
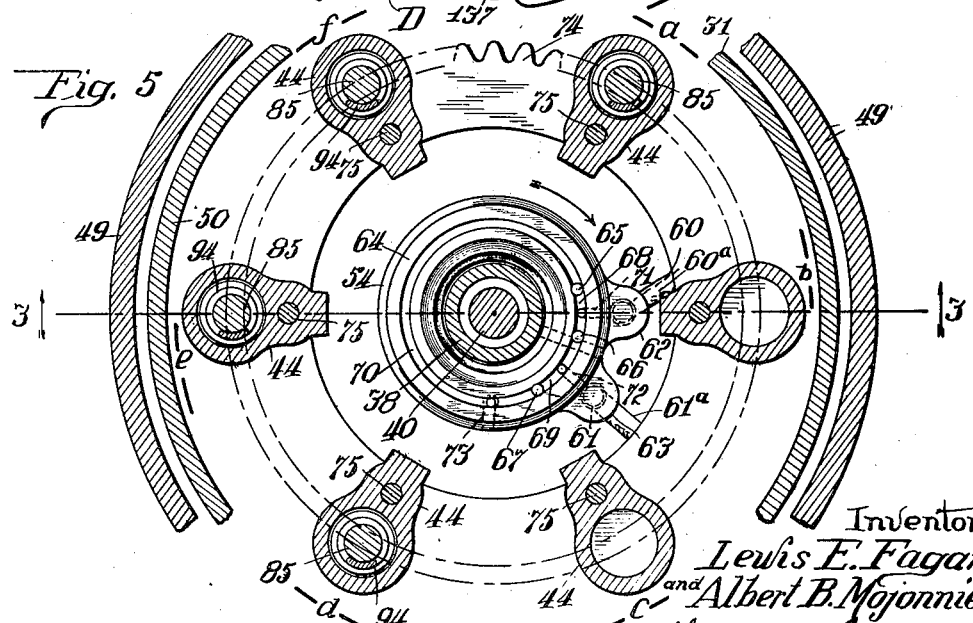

In said drawings, Fig. 1 is a side elevation of the upper portion of a bottle capper constructed and arranged in accordance with the present invention; Fig. 2 is a central vertical section through the same upper portion of the capper; Fig. 3 is a similar vertical section through the lower portion of the capper, the section being, however, somewhat irregular as indicated by the line 3—3 of Fig. 5; Fig. 4 is a plan view of the upper portion of the capper showing particularly the actuating cam and various capping elements associated with it, the point of bottle feed and delivery being indicated diagrammatically by the associated wheels and guides in the upper portion of the figure; Fig. 5 is a horizontal section taken along a plane indicated by the line 5—5 of Fig. 3 but illustrating the grooved bearing member by which air is supplied to and exhausted from the lifters, in plan; Fig. 6 is a vertical section through one of the capper heads, the plane of section being indicated by the line 6—6 of Fig. 7; Fig. 7 is a horizontal sectional view through the same capper head, the plane of section being indicated by the line 7—7 of Fig. 6; Fig. 8 is a plan view of the lower portion of the capper head in association with the cap actuating blade provided for that head, the view being along the plane of separation between the capper head parts and indicated by the line and associated arrows 8—8 of Fig. 6; Fig. 9 is a perspective view of the cap actuating blade; Fig. 10 is a bottom plane view of that portion of the capper head which lies above the separating plane previously mentioned and the direction of the view is indicated by the line and arrows 10—10 of Fig. 6; Fig. 11 is a side elevation of adjusting mechanism by which the upper portion of the capper may be raised and lowered to suit bottles of different heights, the location and direction of the view being indicated by the line 11—11 and associated arrows in Fig. 3; Fig. 12 is a horizontal section through one of the lifters in depressed position, the plane of section being indicated by the line 12—12 of Fig. 3; Fig. 13 is a vertical section through the cam-engaging arm at the upper end of one of the rock shafts associated with a cap advancing blade, the view illustrating the cam-engaging roller and the catch pin by which the cam arm at certain times is held locked against cap feeding position; Fig. 14 is a diagram indicating in plan the position of a capper relative to conveyers and associated conveying wheels for feeding bottles to the capper and delivering them therefrom; Fig. 15 is a diagram of the gearing associated with the parts illustrated in Fig. 14; Figs. 16 to 21 inclusive illustrate the capper parts in various operating positions, Fig. 16 showing the same at the time a bottle is first delivered to a lifter and brought into proper position below the associated capper head, Fig. 17 showing the parts when the bottle has been raised by the application of low pressure air, Fig. 18 showing the parts following the application of high pressure air to the lifter, the capper head in this position together with its rock shaft and cam arm being fully elevated, Fig. 19 showing the parts in a position similar to Fig. 18 except that the cam arm has followed the cam to a point where its catch pin has passed beyond the beveled stop at the top of the capper head, Fig. 20 showing the parts after the bottle has been lowered and the cam arm still holds its catch pin out of possible engagement with the beveled stop, and Fig. 21 showing the parts as they move idly through a cycle without a bottle; and Figs. 22 and 23 are diagrammatic views in section, illustrating the details of feeding a cap from the bottom of the stack of caps in the magazine.

Throughout these views like characters refer to like parts.

It may be pointed out at the beginning that the bottle capper disclosed in the drawings consists essentially of a base A, an upright column or standard B, a rotary bottle carrying base or carrier C journaled to rotate about said column as a center, a series of pneumatically actuated bottle lifters D positioned upon the carrier, a rotary supporting head E near the top of the column, a series of bottle centering and capper heads F carried by the supporting head E and aligned with the lifters D respectively, cap actuating mechanism G associated with each capper head F, a central cam H near the top of the column cooperating with the actuating mechanism G and adjusting mechanism K located beneath the base A and operating to shift the various parts at the top of the column B.

In operation, the bottles are fed one by one upon the lifters D as the latter present themselves at a common feed point. The carrier C which supports the bottle lifters D is directly connected to the supporting head E and the latter directly supports the capper heads F. Consequently as the carrier rotates all these parts rotate with it. During the travel of these parts, the bottles are successively raised and lowered. When in elevated position they engage the capper heads F and the caps are applied. Following the capping operations the bottle lifters are successively lowered and brought to a delivery point where the capped bottles are discharged from the machine.

In case a particular lifter is not supplied with a bottle when it reaches the feed point, then there is no upward movement of the associated capper head and the result is that the feeding mechanism G is latched and held out of action until the carrier has made another revolution. Upon the completion of such revolution, if now a bottle is present upon the associated carrier, then the bottle will lift the head and the operation will be regular as just indicated.

Having pointed out the essential parts of the capper and its general operation, attention may be directed to the details of the several parts.

The base A includes a pedestal 29 mounted upon a flat plate-like support 30 which forms part of the frame of the machine, other portions of the frame including the upright flange 31 and a table 32. In the embodiment of the invention which has been put into service the frame parts just mentioned are parts of a large frame which supports the capper and in conjunction with it, a filler. The latter, however, is not part of the present invention and is therefore not illustrated.

The pedestal 29 has a peripheral flange 33 and securing bolts 34 pass through this flange and on down through openings in the frame plate 30. Nuts 35 serve to securely hold the parts together. The openings in the plate 30 through which the bolts 34 pass are large enough to allow of some relative movement between the pedestal 29 and the plate 30 so that the former may be properly centered with reference to other parts carried by the frame of the machine. For the purpose of providing these adjustments, a plurality of sets of screws 36 are employed. The screws of the illustrated set extend through threaded openings in the flanges 31 and 37 respectively and operatively engage opposite sides of the flange 33. By letting off on one or other of the pair of adjusting screws 36 and tightening up its companion it is possible to shift the pedestal 29 in any desired direction upon the plate 30, within the limits of the openings through which the bolts 34 pass. It will be apparent that ordinarily there will be at least two pairs of adjusting screws 36 and associated parts in order to give a proper centering of the pedestal 29 upon the plate 30, although but one such pair is illustrated. When the pedestal 29 is properly positioned upon the plate 30, then the nuts 35 may be screwed up tight upon the bolts 34 and thus the base parts will be securely held in place. The center of the base pedestal 29 is bored out or otherwise provided with a central opening for receiving the parts of the vertical column B.

The column B includes a stationary tubular standard 38 which is fitted in the vertical bore in the pedestal 29 and secured therein in any suitable way. At its lower end the standard 38 has a bearing ring 39 which is secured to the standard and serves as a bearing for the adjusting rod 40 which extends upward through the standard 38 and carries the supporting head E and other parts in a way which will be presently pointed out. The rod 40 is free to reciprocate in the tube 38 but is held against rotation by a feather 40a carried by the rod and operating in a suitable slot in a bearing ring 41 which is secured to the inside of the tubular standard 38. These bearing rings 39 and 41 are preferably given a press fit in the standard.

The upper end of the tube 38 is also provided with an outer bearing ring 42. This ring is similarly firmly secured to the fixed tube 38 and serves as a bearing for the rotary tubular member 43 which connects the supporting head E and the rotating base or carrier C so that the two rotate together, although connection is provided by which the head E may be raised and lowered with reference to the standard 38 and the connecting tube 43. The carrier C is round casting provided near its periphery with a series of spaced posts 44 which carry the parts of the lifters D. The body 45 of the carrier is centrally apertured so as to pass freely over the standard 38 of the column B. The central bore of the carrier also has a bearing ring 46 which has a close fit with the body 45 and rotates with the carrier C about the standard 38. The central bore of the carrier C is also slightly increased in diameter at its upper end so as to receive the lower end of the tubular member 43. A key 47 between the flange 48 of the carrier and the tube 43 serves to hold the parts together against relative rotation. The carrier C has a peripheral flange or petticoat 49 which overlaps an upturned flange 50 on plate 32 and the upper end of the upright flange 31 of the base.

The posts 44 of the carrier are provided with passages 51 for supplying compressed air to the lifters and exhausting the same therefrom. The passages 51 communicate with inclined passages 52 in the body 45 of the carrier and these inclined passages in turn communicate with vertical passages or ports 53 which terminate at the under annular bearing surface of the carrier. This surface rests upon a bearing ring 54 which is supported by the base pedestal 29 at a single bearing point furnished by the upper end of the supporting pin 55. This pin enters a vertical opening in the base A and may be adjusted up and down by a vertical adjusting screw 56 which is threaded through a threaded opening in the base A and thus forms a bearing or support for the lower end of the pin 55. This pin is the sole support for the bearing ring 54 and the movable base or carrier C supported by it. The screw bolt 56 is locked in position by a lock nut 57.

These contacting surfaces, the one on the upper side of the pedestal 29 and the other on the under side of the bearing ring 54, are in effect the valve faces of a distributing valve which controls the air supplied to and exhausted from the several lifters D.

The one point support for the bearing member 54 and the parts supported by it, is most effective in maintaining good contact between these valve faces at all times. To insure such good contact the pipes by which the compressed air is supplied, namely pipes 60 and 61, are connected at their lower ends to pieces of hose 60a and 61a respectively. The upper ends of the pipes are firmly screwed into openings in the bosses 62 and 63 respectively. By this construction it is obvious that the pipes 60, 61 will rise and fall with the bearing ring 54, all relative motion being taken up by the hose connections. Thus, there is a continued maintenance of the requisite close engagement between the bearing surfaces on the carrier C and the ring 54.

It is by means of the pin 55 that the height of the carrier C, and hence the height of the lifters D, is varied. This variation in height enables the machine to be properly adjusted relative to the conveyers which bring bottles to the machine and carry them away from it.

The upper bearing surface of the bearing ring 54, which may be designated generally 64, is provided with an annular groove which is divided by plugs 65, 66 and 67, into three sections or groove ports 68, 69 and 70. The section 68 is provided with a passage 71 which leads to the low pressure pipe connection 60. In like manner, section 69 is provided with a passage 72 which is in communication with the high pressure air supply pipe 61. The third section 70 is similarly provided with a passage 73 which leads through the wall of the bearing member 54 to atmosphere. In putting the invention into practice, we have used for our low pressure air a pressure of from eight to ten pounds per square inch. For the high pressure air, we have used a pressure varying from about fifteen pounds to twenty-five pounds per square inch. As previously noted, the low pressure is sufficient to bring the cap and bottle together, and the high pressure is used to bring about a complete setting of the cap against the shoulder in the neck of the bottle. These operations will be more fully understood when the operation of the lifters D is more completely set forth hereinafter.

A circular toothed rack 74 is secured to the under side of the carrier C by machine screws 75, or other suitable means, and this rack, which is in effect a gear wheel of considerable diameter, is driven through the agency of a cooperating gear wheel 76. The rotation of the carrier is continuous as long as the wheel 76 is in operation, the main bearing of the carrier being the bearing ring 54 previously mentioned. The latter is relatively fixed and responds only to forces which tend to improve its engagement with the bearing face of the carrier.

In this connection, it should be noted that the under face of the member 54 is provided with a radial groove 77 and the upper end of the bearing pin 55 is cut away to provide a feathered end 78 which is of sufficient size to fit snugly in the groove 77. The groove enables the member 54 to be moved more or less without dislodging or placing any particular strain on the pin 55. On the other hand, the feathered end 78 of the pin 55, by engaging in the groove 77, holds the bearing member 54 against any possible rotation.

The pneumatically actuated lifters D, as previously pointed out, are spaced around the periphery of the carrier C and include the upstanding posts 44. Each lifter D includes also a head 79 having a skirt or cylindrical wall 80 which passes down around the post 44. The connected head 79 and skirt 80 form an open ended cylinder and by providing an air-tight, or substantially air-tight, sliding connection between the skirt 80 and the top of the post 44, it is possible to elevate the cylinder by admitting compressed air into the space beneath the head 79. The passage through which air is thus admitted is, in the case of each lifter D, the passage 51 previously mentioned.

The substantially air-tight connection between the cylinder wall and the top of the post is provided by a cup leather packing 81 which is secured between retaining rings 82 and 83 by machine screws 84 which pass down through the parts into threaded openings in the top of the post 44. The leather packing 81 is upturned and fits snugly against the interior surface of the cylinder wall 80.

From what has been said, it will be seen that the cylinder may be easily elevated by the admission of air through the passage 51. Now, in order to return the cylinder to its lowermost position and thus clear out the cylinder when an exhaust position is reached, we employ a return spring and dash pot construction. To this end, the head 79 is connected to the upper end of a rod 85. This rod is seated in a recess formed within an annular flange 86 extending downward from the head 79. A pin 87 connects the piston rod 85 to the head 79, the connection being made by passing the pin through the flange 86 and a small transverse hole drilled through the upper end of the rod. The rod 85 is held against rotation by means of two keys 88 which extend into longitudinal slots 89 cut in opposite sides of the rod. The keys 88 are secured to the upper end of a tube 90 and the latter is suitably secured to the post 44. Thus the head is held against rotation but is allowed to move up and down. The upper end of the tube 90 has a thickened annular portion 90ª which is notched to receive the keys 88 and the latter are firmly secured in place by rivets 90ᵇ or like suitable retaining means.

The tube 90 extends down into a central well 91 formed in the post 44. It is preferably secured in place by a set screw 92 which is threaded through a threaded opening in the post 44 and passes at its inner end into a hole in the wall of the tube 90. The screw 92 is preferably provided with a cap nut 93 and an associated gasket 93ª. The downward pull upon the head 79 is furnished by a coiled compression spring 94 which bears at its upper end against the under side of the overhanging thickened portion 90ª of the tube 90 and at its lower end upon the upper side of a dash pot piston 95 which is secured to the lower end of the rod 85. The piston 95 may fit loosely in the well 91 and perform its proper dash pot functions. In the present instance, however, we have drilled two small holes 96 through the piston 95. These openings 96 place the space below the piston in communication with the space above the piston. When in service, the well 91 is filled with oil or other retarding liquid to a level approximating the point 97. The tension of the spring 94 is such that when actuating compressed air is removed from the cylindrical space below the head 79, then the spring will bring the parts downward and leave the head in substantial engagement with the top of the post 44.

Each head 79 is preferably provided with a wear plate 98 which is secured in place by a plurality of screws 99. The skirt 80 is preferably secured to the head 79 by fitting the same over an annular flange 100 and employing solder to make a soldered joint 101.

The rotary supporting head E, as previously pointed out, is secured to the connecting tube 43 so as to rotate with the carrier C. On the other hand, it is mounted so as to slide up and down with reference to the connecting sleeve 43, this up and down movement being brought about by raising and lowering the adjusting rod 40. The connection between the head E and the tube 43 is provided by locating a longitudinal slot 102 on the outside of the tube 43, and using with it a feather or key 103 secured to the hub 104 of the supporting head E. In the present instance, the feather 103 is held in place by a set screw 105 which passes through an opening in the hub 104 into threaded engagement with an opening in the feather 103.

The connection between the supporting head E and the adjusting rod 40 includes a sleeve 106 which is flanged at its lower end and secured to the top of the head E by machine screws 107 or other suitable means. The sleeve 106 has an apertured head 108 at its upper end and the rod 40 extends through the aperture in this head. A cooperating coupling member 109 takes the form of a sleeve terminating in a flange 110 at its lower end. The member 109 is secured to the rod 40 by means of a transverse pin 111. The flange 110 fits into a recess in the upper side of the head 108 and is held against vertical displacement by a retaining ring 112 which is similarly recessed on its under side to fit over the flange 110. The retaining ring 112 is held in place by suitable machine screws 113, or otherwise, as desired. The flange 110 fits loosely within the space between the head 108 and the retaining ring 112, and therefore the sleeve 106, including its head 108 and the retaining ring 112 attached thereto, is free to rotate with reference to the adjusting rod 40 and the retaining member 109 fixed to it.

The supporting head E is provided with a number of arms 114 which terminate at their outer ends in bosses 115 which are provided with vertical openings into which the stems 116 of associated cap applying plungers 117 are adapted to extend. A shoulder 118 formed on each plunger limits its upward movement when positioning it in the boss of the supporting head. When the plunger is in proper position it is held in place by a retaining pin 119 which passes through openings in the boss and pin and may be readily removed when it is desired to remove the plunger and parts connected with it. If desired, a clip pin 120 may be used upon the inner end of the pin 119 to hold the same from displacement, the outer end of the pin having a head which serves the same function at that end of the pin.

The plunger 117 in each instance serves to support the associated capper head F. This head includes an upper casing 121 and a lower bottle centering member 122. These two parts are connected together in any suitable way as by means of the machine screws 123.

The capper head is held in place upon the plunger by a transverse pin 124 which lies with its head in a recess formed in the plunger and has its unheaded end projecting through a slot 125 formed in one wall of the member 121. The pin 124 and slot 125 are so related that the members 121 and 122 can be moved bodily up and down upon the plunger 117. There is also an opening 126 on the opposite side of the member 120 from the slot 125 which is large enough to pass the headed pin 124. When the parts are in position upon the supporting head E, then the pin 124 never gets to a point where it lies opposite the opening 126 and consequently the capper head cannot be removed from the plunger without the plunger first being removed from the supporting head E. The latter, of course, is accomplished by removing the pin 119 and then withdrawing the plunger from the head E. As soon as this is done, the member 121 may be moved along upon the plunger far enough to bring the pin 124 in line with the opening 126. When this point is reached the pin 124 may be removed and the plunger 117 and member 121 separated. From what has been said it will be seen that this assembly of parts lends itself readily to separation of its elements to enable thorough cleaning and as readily to their restoration to their proper places in the assembly after having been cleaned.

The member 121 includes not only the cylindrical passage 127 in which the piston 117 is adapted to move, but it also includes a cap magazine 128 in which the caps 129 are stacked. As clearly shown, the stack of caps 129 occupies a position parallel to that occupied by the piston 117.

The lower capper head member 122 is provided with a downwardly extending flange 130 which engages each incoming bottle and assists in centering it directly beneath the plunger 117. The member 122 is also shaped so as to provide a sort of pocket 131 into which the upper end of the bottle will fit snugly. The opening through which the lower end of the plunger 117 passes when the capper head is moved upward by the associated lifter when a bottle is properly positioned is given a slightly converging wall 132 such that when a cap, such as the cap 133 of Fig. 6, is moved down through it, the cap will be contracted in diameter so that when it passes into the top of the bottle and is pressed home upon the shoulder thereof, it will spring outward into firm and tight engagement with the interior of the bottle neck above the shoulder and thus form a tight seal.

Now, when it comes to positioning the caps one by one beneath the associated plunger, we make use of the cap actuating blade member 134. This blade is an important element of the cap actuating mechanism G, previously mentioned. The blade member includes an arm 135 which extends outward from a boss 136 and at its outer end it carries the cap engaging blade 137 which has a somewhat extended arcuate upper surface so that it may underlie the stack of caps when in its most advanced position and hold them thus elevated until it has passed on its return stroke far enough to disengage them and allow them to fall in position so that it will upon its next advance engage only the edge of the lowermost cap to advance it, while leaving the others intact in the cap magazine. This action will be better understood when it is realized that the member 122 is provided on its under surface with a depression 138 which is arcuate and extends between the magazine chamber 128 and the capper chamber 127. It is in the passageway formed in part by this depression 138 that the blade 137 travels in its to and fro oscillations. The channel for the blade is not formed wholly by the depression 138 in the member 122 but part of it is formed by a cooperating depression 139 formed in the member 121. These arcuate depressions are clearly shown in Figs. 8 and 10, and from them it will be understood that when the members 121 and 122 are properly assembled, there will be a proper resulting channel for the movements of the cap actuating blade 137.

It will be apparent that when the forward edge of the cap engaging blade 137 has passed to the left of the cap magazine 128, as the parts are viewed in Fig. 7, then the entire stack of caps will rest upon overhanging portions 140 and 141 of the member 122. As will be apparent from the dotted line position of the magazine 128 in Fig. 8, the portions 140 and 141 constitute ledges which extend underneath the stack of caps 129 and support them within the magazine 128. These ledges will constitute the sole support of the caps when the blade 137 is in its left-most position, as the parts are viewed in Figs. 7 and 8, entirely out of engagement with any of the caps. With the parts in this position, it will be apparent that as soon as the blade 137 advances it will engage only the edge of the lower-most cap 129 of the stack. As the blade still further advances, this forward edge will push the cap along the channel formed by the mating depressions 138, 139, while the upper surface 142 of the blade will ride freely under the next cap of the stack, that is to say, the cap immediately above the one being advanced by the blade. In this way, the face 142 of the blade holds the stack elevated and maintains it in this condition all through the advance travel of the blade and then until the blade has entirely receded to its starting point beyond the cap magazine. The withdrawal of the blade 137 will then allow the stack column to descend upon the ledges 140 and 141 and remain there in readiness for the next like operation.

While considering the operation of the blade 137 in advancing a cap, as cap 133 of Fig. 6, it should be noted that the upper forward edge of blade 137 is provided with a bevel 137$^a$. The purpose of this bevel is to cause the caps to separate after the manner illustrated in Figs. 22 and 23. As there shown, the lowermost cap, that designated 133, is being withdrawn from the magazine and separated from the caps 133$^a$, 133$^b$ just above it. The forward edge of the blade 137 engages the edge of the disk 133 and advances it and at the same time the bevel 137$^a$ engages the cap 133$^a$ and raises its edge upward, moving the cap 133$^b$ and other caps above it. Then as the blade 137 advances, the cap 133 is left quite clear of cap 133$^a$ and the other caps. This action is especially important where the caps have tabs on them which are attached by wire staples or stitching. The bevel 137$^a$ slides freely under the wires of the caps and greatly improves the action of the blade or flipper 137. Without the bevel 137$^a$ there is greater danger of the blade engaging the wire of a wire-stitched cap and thereupon feeding it too far or in some other improper way.

Now, in order to give the blade 137 its proper movements back and forth in the channel between the cap magazine and the plunger chamber, we provide a rock shaft 143 and journal the same in bearings 144, 145, which extend outward from the upper and lower portions respectively of the member 121 of the capper head. The shaft 143 is held against downward movement by a collar 146 which is suitably secured to the shaft as by the pin 147. The lower end of the shaft 143 receives the boss 136 of the blade member 134 and the two are firmly secured together by any suitable means as by the pin 148. Thus, the shaft 143 is free to rock in its bearings 144 and 145 and it will be kept from displacement by the collar 146 and the boss 136. The rocking movements will be brought about by spring pressure and the crank or rocker arm 149, secured to the upper end of the shaft 143 by a pin 150, or other suitable means.

The crank arm 149 terminates at its outer end in a vertically disposed sleeve 151. The upper end of the sleeve opening 152 is closed by a bearing pin 153 which is fixed in place in the sleeve by a transverse holding pin 154 or other suitable means. On the bearing pin 153 is journaled an anti-friction roller 155. This roller is held in place by an end block 156 which is secured to the upper end of the bearing pin 153 by a transverse holding pin 157. It is the anti-roller 155 which engages the cam face of the cam member H. The sleeve 151 also carries a latch pin 158 which is passed through an opening at the lower end of the chamber 152 and is limited in its downward movement by a collar 159 which engages the floor of the chamber 152. A coiled spring 160 acts between the under side of the bearing pin 153 and the upper side of the latch pin 158. In order to center the spring 160, these pins are respectively provided with reduced ends which pass between the coiled ends of the spring.

We also employ upon the rock shaft 143 a coiled spring 161 which is a torsion spring which tends to move the cap advancing blade 137 to its foremost position illustrated in Fig. 8. The blade is moved from this normal position by rocking the shaft 143 in a direction such as to move the crank arm 149 outward away from the axis of the machine. This outward movement is brought about by the cam H. Thus, the spring 161 tends at all times to press the anti-friction roller 155 toward the cam and to hold the cap advancing blade in its foremost position.

To bring about the requisite spring tension, the upper end of the spring 161 is preferably seated in an opening in the bearing 144, as indicated by the upturned end 162. At the lower end of the spring 161 the connection is made between the spring and a rotary sleeve or collar 163, the downward lower projecting end of the spring being located in a vertical opening in the top of the member 163, as indicated at 164 in Fig. 7. The member 163 has provided in its upper surface four notches 165 which are arranged in diametrically opposite pairs adapted to receive the ends of a transverse adjusting pin 166, which extends through the shaft 143. It will be obvious that by rotating the collar 163 about the shaft 143, the spring 161 may be placed under any desired tension which, when the collar 163 is secured to the shaft 143, will operate to move the shaft and its cap propelling blade in the manner previously pointed out.

In giving this tension to the spring 161, it will of course be necessary to rotate the collar 163 to give the tension before inserting the pin 161 into the sleeve in engagement with an appropriate pair of notches 165. Ordinarily, this adjustment can be made by the manufacturer and need not be subsequently modified. However, if it is to be modified, it will be necessary to remove the adjusting pin 166 before attempting to rotate the collar 163.

The cam H which engages the anti-friction roller 155 to give the rocker arm 149 its proper actuation to move the cap engaging blade in timed relation with the other parts of the capper, comprises a downwardly extending flange 167 upon the periphery of which is the cam face with which the roller 155 is adapted to engage. The flange 167 is at the periphery of a horizontal plate 168, and the latter extends outwardly from a vertical sleeve 169 which is integral with an apertured head 170. This head has a thickened annular portion 171 which immediately surrounds and bears upon the vertical portion of the connecting member 109, secured to the upper end of the adjusting rod 40. Set screws 172 pass through suitable threaded openings in the portion 171 and the sleeve member 109 and securely connect the cam member H with the upper end of the adjusting rod 40.

The relation of the cam surface to the various actuating mechanisms G as the carrier C and head E are rotated, is shown more particularly in Fig. 4 wherein the direction of rotation is clockwise, as indicated by the associated arrow. For convenience in considering this relation, the six positions illustrated in Fig. 4 are designated a, b, c, d, e and f. As the cam is there shown, the crank arms 149 of the several capping mechanisms G occupy different positions. In this figure the last bottle to have been received by the machine would be upon the lifter D at the "a" position. This is true because the conveyer wheel 173 coacts with the fixed guide 174 to deliver incoming bottles to the carriers. This is the position illustrated in Fig. 16. In this position the roller 155 has engaged the surface of the cam H and moved the blade 137 backward far enough to bring its forward edge approximately to the center of the cap magazine 128. In this position, as will be apparent from an inspection of Fig. 5 where the air supply passages are shown and the positions are designated by the same letters, it will be apparent that the lifter D will still have its air chamber connected to atmosphere by reason of its port 53 being in communication with the segment 70.

Now, passing to position "b", we find that the capper blade 137 is still further removed from the cap magazine 128 and in this position, as will be apparent from an inspection of Fig. 5, the air chamber of the associated lifter D will be supplied with low pressure air furnished through the segment 68 of the fixed bearing 54 and port 53 of the associated lifter. In this position the bottle, assuming that one is present on the lifter, is forced upward against a previously positioned cap in the associated capper head. This action merely brings the bottle up against the capper head F and properly centers the bottle by seating its upper end in the socket 131 without forcing the cap into its final position in the bottle. It will be noted that the rocker or crank arm 149 in this position has moved far enough to cause its latch pin 158 to have passed over the inclined face of the fixed stop 175 and to have dropped down in behind its vertical face.

In this connection it may be noted that if there were no further upward movement of the capper head, then the rocker arm 149 would remain locked in this position until it again came around to position "b". This is the condition illustrated in Figure 21 where the parts remain locked as the cam wheel passes out of engagement with the actuating cam H. It will be obvious that it requires a second engagement with the cam at a point adjacent to the "b" position in order to again place the crank arm in normal operation. This will, of course, occur only when a bottle is upon the particular lifter and operates to raise the crank arm high enough to free the latch pin 158 from the stop 175.

But assuming that there are bottles in all the positions illustrated, we now pass beyond position "b", let us say, to a position half way between positions "b" and "c". There high pressure air will be supplied through the segment 69 and port 53 of the associated lifter and the latter will be thrust upward beyond the low pressure position of Fig. 17 and the parts will be brought to the position illustrated in Fig. 18. This upward thrust of the bottle against the capper head F will cause the latter to complete the capping operation by forcing the cap down into the neck of the bottle against the usual shoulder.

Then, passing to position "c", we find a lower portion of the cam flange 167 being engaged by the roller 155. The parts have also reached the position where the high pressure air connection is about to be replaced by a connection to atmosphere. By reason of the lower portion of the cam being engaged, the latch pin 158 will have passed far enough beyond stop 175 so that the arm 149 will not be locked as in Fig. 21. This is the position illustrated in Fig. 19 just before the high pressure air is removed. As soon as the parts leave position "c", the high pressure will give place to atmospheric pressure, and the parts will assume the position illustrated in Fig. 20.

This is the condition shown in the still further advanced position "e". Here, as before the lifter is in communication with atmosphere and has descended and the crank arm 149 has dropped so as to bring catch pin 158 on the inclined side of the stop 175, as illustrated in Fig. 20. Obviously, because of this relative position of the pin and stop, the crank arm 149 will not be locked against actuation under the force of the torsion spring 161, but will be free to engage the cam in subsequent positions when called upon to repeat the capping operation.

It will be noted that in position "c" the cap blade 137 is in its rearmost position and ready to advance to remove the lowermost cap from the stack and advance it into plunger engaging position. When we examine the position "d", we find that the capper blade 137 has started its forward movement and in the operation of the mechanism would be advancing a cap toward the plunger position.

When we come to position "e", we will find the cap advancing blade 137 in its fully advanced position. This will mean that a cap is properly located beneath the plunger of that particular capper head, all in readiness for subsequent insertion into the top of an appropriately positioned bottle, once the mechanism reaches the "a" position and properly receives a bottle.

In the "f" position, the cap advancing blade 137 remains as it was in the "e" position. This is due to the fact that the cam H does not actuate the capping mechanisms G in these positions, the arm 149 remaining away from the cam. As the capped bottle reaches the position "f", it is engaged by a conveyer wheel 176 which works in conjunction with a fixed guide 177 to remove the capped bottle from the carrier.

From this consideration, more particularly of Figs. 4 and 5, we have seen how a filled bottle is placed upon a capper lifter and carried around through successive positions and finally delivered with a proper cap in its top. These bottles, as will be apparent, will be placed successively upon succeeding lifters and each will receive the same treatment by the parts of the mechanism. As we have also seen, if the lifter fails to receive a bottle, then the mechanism will lock itself against cap feeding action and will remain in this locked position until it has made one complete revolution, during which time, if it has received a bottle on its lifter, it will be in readiness to act upon it, as it has done with previously properly positioned bottles.

In the diagram of Fig. 14, we have the conveyer 178 which, in the particular embodiment illustrated, passes around a corner in proximity to the conveying wheels 173 and 176 previously mentioned as operating to feed the bottles into and out of the capper respectively. The conveyer 178 may be of any preferred construction, and preferably is of the general type illustrated in Mojonnier Patent No. 1,804,701, granted May 12, 1931. Obviously, other conveyer arrangements might be employed than that shown. In this instance, the carrier C is shown with the lifters D in spaced relation upon it, but not occupying the relative positions a, b, c, etc., indicated in Figs. 4 and 5.

Obviously, the gear wheel 76 which drives the rack 74 located upon the under side of the carrier C, may be driven in any suitable way. In the present instance, as diagrammatically shown in Fig. 15, the gear wheel 76 is driven by a pinion 179 located upon a shaft 179ᵃ upon which bevel gear wheel 180 is keyed. The teeth of the wheel 180 are engaged by a bevel pinion 181 mounted on a shaft 182 provided with suitable bearings 183. A pulley 184 on one end of the shaft 182 is driven by a belt 185 which, in turn, is driven by a pulley wheel 186 upon an electric motor 187. As clearly shown, the gear wheel 76 is keyed to a shaft 188 and this shaft carries at its upper end the conveyer wheel 173. In order to actuate the delivery conveyer wheel 176, which is mounted on shaft 189, a gear wheel 190 is provided. The teeth of the wheel 190 mesh with the teeth of the rack 74 and the conveyer wheel 176 is therefore driven from the carrier. With this arrangement filled bottles may be furnished to the capper and carried from it. In the diagram of Fig. 14 the driving belt 185 is enclosed in a protective casing 191 and the guides 174 and 177 are the upturned flanges upon a single plate 192 suitably secured by screws 193 or other means to a support associated with the conveyer 178.

In order to adapt the capper to bottles of different sizes, some adjusting means must be employed. In the present instance, we preferably arrange for the raising and lowering of the supporting head E and the parts which are carried by it. In brief, this is done by raising and lowering the center rod 40 which passes up through the tubular standard 38 upon which the various capper parts are mounted. The lower end of the rod 40 terminates in a threaded reduced portion 194 and this reduced portion passes through a horizontal web 195 of an end member 196. Nuts 197 threaded upon the end 194 engage opposite sides of the web 195 to determine the adjustment between the rod 40 and the member 196. Besides being furnished with the web 195, the member 196 has an upper portion 198 which is provided with a central bore through which the lower end of the rod 40 passes. This structure strengthens the connection between the member 196 and the rod 40 and yet allows for a nice adjustment of the parts relative to each other. The lower end of the member 196 has aligned bosses 199 which receive bearing pins 200 which are secured to the bosses by transverse holding pins 201, the outer ends of the pins 200 being headed, in order to properly hold previously positioned links 202. Thus, the links have a pivotal connection with the lower end of the member 196, one link being on one side and the other on the other side. In a similar manner, the upper ends of the links 202 are connected to the bifurcated ends 203 of a crank arm 204, which is secured by suitable means to a shaft 205. Headed pins 206 provided with transverse holding pins 207 furnish the pivotal connection between the links 202 and the bifurcated arms 203.

The shaft 205 is journaled in any suitable supports, such as the hangers 208 which extend downward from the under side of the frame of the machine. The same frame carries outwardly extending arms 209 which are apertured to provide bearings for a shaft 210 upon which is located a worm gear 211. The worm gear cooperates with a worm wheel 212 located upon the shaft 205 and keyed or otherwise secured to it. The crank 213 is shown connected to the end of the shaft 210 and by its rotation the worm 211 will actuate the worm wheel 212 and thus rotate the shaft in one direction to raise the outer end of the crank arm 204 to lift the rod 40 and its connected parts or, on the other hand, to rotate the shaft 205 in the opposite direction to lower the outer end of the crank arm 204 and thus lower the rod 40 and the parts carried by it.

In carrying out our invention it will be apparent that many alterations and modifications may be made in the particular constructions illustrated while still employing the present invention. It is therefore our aim to cover by the terms of the appended claims all such alterations and modifications as rightly come within the spirit and scope of the same.

We claim:

1. A bottle capper comprising a central column, a rotary bottle carrying base journaled to rotate about said column as a center, pneumatically actuated bottle lifters positioned on said base, a rotary supporting head above said lifters, cap applying plungers removably secured to said head in vertical alignment with said bottle lifters respectively, vertically movable bottle centering members reciprocably mounted on said plungers respectively, a cap magazine carried by each of said members, a cap engaging blade for removing the lowermost cap from each of said magazines into position below the associated plunger, means for holding the caps while being thus moved and positioned, a vertical rock shaft carried by each said centering members and carrying the associated blade at its lower end, a cam engaging arm at the upper end of each rock shaft, a cam for engaging all of said arms to rock the associated shafts to feed caps, said cam being fixed to said column against rotation, a catch for locking each said arm against feeding operation, and means for rotating said base and head at the same speed, the bottle centering members operating when actuated by bottles beneath them raised by the associated bottle lifters, to free said rock arms from engagement with said catches to leave their shafts free for subsequent feeding operations.

2. A bottle capper comprising a central column, a rotary bottle carrying base journaled to rotate about said column as a center, pneumatically actuated bottle lifters positioned on said base, a rotary supporting head above said lifters, cap applying plungers removably secured to said head in vertical alignment with said bottle lifters respectively, vertically movable bottle centering members reciprocably mounted on said plungers respectively, a cap magazine carried by each of said members, a cap engaging blade for removing the lowermost cap from each of said magazines into position below the associated plunger, means for holding the caps while being thus moved and positioned, a vertical rock shaft carried by each said centering members and carrying the associated blade at its lower end, a cam engaging arm at the upper end of each rock shaft, a cam for engaging all of said arms to rock the associated shafts to feed caps, said cam being fixed to said column against rotation, a catch for locking each said arm against feeding operation, and means for rotating said base and head at the same speed, the bottle centering members operating when actuated by bottles beneath them raised by the associated bottle lifters, to free said rock arms from engagement with said catches to leave their shafts free for subsequent feeding operations, the plunger, centering member, magazine, rock shaft, blade and cam engaging arm associated with each said lifter being removable as a unit from said rotary head.

3. A bottle capper comprising a vertically movable bottle lifter, a cap applying plunger above and in vertical alignment with said lifter, a bottle centering member vertically reciprocable on said plunger, a cap magazine carried by said centering member, a cap engaging blade for removing the lowermost cap from said magazine into position below said plunger and above a positioned bottle, means for holding the cap while being thus moved and positioned, a vertical rock shaft carried by said centering member and supporting said blade at its lower end, a cam engaging crank arm at the upper end of said shaft, a cam for engaging said arm to rock said shaft to feed caps, a catch for holding said arm against feeding operation, said catch being freed from said arm whenever said centering member is raised by a bottle upon said lifter, and means for relatively fixing said cam on the one hand and rotating said lifter, centering member and rock shaft on the other hand.

4. A bottle capper comprising a vertically movable bottle lifter, a cap applying plunger above and in vertical alignment with said lifter, a bottle centering member vertically reciprocable on said plunger, a cap magazine carried by said centering member, a cap engaging blade for removing the lowermost cap from said magazine into position below said plunger and above a positioned bottle, means for holding the cap while being thus moved and positioned, a vertical rock shaft carried by said centering member and supporting said blade at its lower end, a cam engaging crank arm at the upper end of said shaft, a cam for engaging said arm to rock said shaft to feed caps, a catch for holding said arm against feeding operation, said catch being freed from said arm whenever said centering member is raised by a bottle upon said lifter, and means for relatively fixing said cam on the one hand and rotating said lifter, centering member and rock shaft on the other hand, said plunger, centering member, magazine, rock shaft, blade and crank arm being removable as a unit from the other parts of the capper.

5. A bottle capper comprising a vertically movable bottle lifter, a cap applying plunger above and in vertical alignment with said lifter, a bottle centering member vertically reciprocable on said plunger, a cap magazine vertically movable with said centering member, a cap actuating blade, a vertically disposed rock shaft connected to said blade to oscillate the same to remove a cap from said magazine and present it beneath said plunger and above a bottle on said lifter, a crank arm at the upper end of said rock shaft, a cam located in a horizontal plane and operative to rock said rock shaft, and means for holding said rock shaft against operation by said cam, said holding means being movable out of holding position by the upward movement of said centering member.

6. A bottle capper comprising a vertically movable bottle lifter, a cap applying plunger above and in vertical alignment with said lifter, a bottle centering member vertically reciprocable on said plunger, a cap magazine vertically movable with said centering member, a cap actuating blade, a vertically disposed rock shaft connected to said blade to oscillate the same to remove a cap from said magazine and present it beneath said plunger and above a bottle on said lifter, a crank arm on said rock shaft, a cam located in a substantially horizontal plane and operative to move said crank arm to rock said rock shaft, and means for holding said rock shaft against operation by said cam, said holding means being movable out of holding position by the upward movement of said centering member; said plunger, centering member, magazine and removing means being removable as a unit from the other parts of the capper.

7. A bottle capper comprising a rotary bottle carrying base, vertically movable bottle lifters positioned in said base, a rotary head above said lifters, plungers removably secured to said head in vertical alignment with said lifters respectively, bottle centering members vertically reciprocable on said plungers respectively, a magazine associated with each of said centering members, cap engaging blades for removing caps from said magazines into positions below said plungers respectively, means in each case for holding the cap being thus moved and positioned, a vertical rock shaft associated with each plunger and carrying the associated feeder blade at its lower end, a cam engaging arm at the upper end of each said shaft, a cam for engaging said arms to cause them to successively feed their caps, catches for holding said arms against feeding operations, said arms being respectively freed from said catches for operation in response to the upward movement of said centering members under the action of upwardly moving bottles carried by said lifters, and means for relatively fixing said cam on the one hand and rotating said rotary base and head and associated parts on the other hand.

8. A bottle capper comprising a rotary bottle carrying base, vertically movable bottle lifters positioned in said base, a rotary head above said lifters, plungers removably secured to said head in vertical alignment with said lifters respectively, bottle centering members vertically reciprocable on said plungers respectively, a magazine associated with each of said centering members, cap engaging blades for removing caps from said magazines into positions below said plungers respectively, means in each case for holding the cap being thus moved and positioned, a vertical rock shaft associated with each plunger and carrying the associated feeder blade at its lower end, a cam engaging arm at the upper end of each said shaft, a cam for engaging said arms to cause them to successively feed their caps, catches for holding said arms against feeding operations, said arms being respectively freed from said catches for operation in response to the upward movement of said centering members under the action of upwardly moving bottles carried by said lifters, and means for relatively fixing said cam on the one hand and rotating said rotary base and head and associated parts on the other hand, each set of associated plungers, centering members, magazines, rock shafts, blades and cam engaging arms being removable as a unit from said rotary head.

9. A bottle capper comprising a rotary bottle carrying base, vertically movable bottle lifters positioned in said base, a rotary head above said lifters, means for rotating said base and head as a unit, plungers removably secured to said head in vertical alignment with said lifters respectively, bottle centering members vertically reciprocable on said plungers respectively, a cap magazine associated with each centering member and vertically movable with it, means associated with each magazine for removing caps from it and presenting them one by one beneath the associated plunger and above a bottle on the lifter therebelow, a single cam for actuating all of said removing means, and means for holding said removing means separately out of cap feeding operation by said cam, the holding means being movable out of holding position in each instance by the upward movement of the associated centering member.

10. A bottle capper comprising a rotary bottle carrying base, vertically movable bottle lifters positioned in said base, a rotary head above said lifters, means for rotating said base and head as a unit, plungers removably secured to said head in vertical alignment with said lifters respectively, bottle centering members vertically reciprocable on said plungers respectively, a cap magazine associated with each centering member and vertically movable with it, means associated with each magazine for removing caps from it and presenting them one by one beneath the associated plunger and above a bottle on the lifter therebelow, a single cam for actuating all of said removing means, and means for holding said removing means separately out of cap feeding operation by said cam, the holding means being movable out of holding position in each instance by the upward movement of the associated centering member, each plunger and the centering member, magazine and removing means associated with it being removable as a unit from said rotary head.

11. In a bottle capper, a support having a boss provided with a vertical bore, a plunger having a shank fitted into said bore, a locking pin extending transversely through aligned openings in said shank and boss, said plunger having a shoulder abutting against a flat face on the under side of said support, a bottle centering member sleeved on said plunger and having a vertical slot in one side, and a headed pin extending through an opening in said plunger and through said vertical slot, the head of said pin resting in a countersunk end of said opening and engaging at all times with the wall of the sleeved portion of said centering member whenever said plunger is pinned in place in said support, an opening in the wall of said sleeved portion opposite the lower end of said slot permitting the withdrawal of said headed pin only when said locking pin is removed and said plunger is lowered with reference to said centering member to bring said headed pin into alignment with the said opening in said member, the upper end of said member before the removal of said locking pin from said plunger engaging the under face of said support as a stop to prevent withdrawal of said headed pin before withdrawal of said locking pin.

12. In a bottle capper, a support having a vertical bore, a plunger having its upper end fitted into said bore, a transverse locking pin for securing said plunger to said support, a bottle centering member sleeved on said plunger and vertically movable thereon, said member having a vertical slot in one side and an opening in the other side opposite the lower portion of said slot, and a headed pin extending transversely through said plunger and slot and having its head normally bearing against the inside of the sleeve wall of said centering member and in a countersink in said plunger, the upper end of said centering member normally engaging said support as said member is moved upward over said plunger before said headed pin comes into line with the said opening in said centering member, whereby said member can be withdrawn from said plunger only after the latter is removed from said support following the withdrawal of said first mentioned locking pin.

13. In a bottle capper, a support having a vertical bore, a plunger having its upper end fitted into said bore, a transverse locking pin for securing said plunger to said support, a bottle centering member sleeved on said plunger and vertically movable thereon, said member having a vertical slot in one side and an opening in the other side opposite the lower portion of said slot, a headed pin extending transversely through said plunger and slot and having its head normally bearing against the inside of the sleeve wall of said centering member and in a countersink in said plunger, the upper end of said centering member normally engaging said support as said member is moved upward over said plunger before said headed pin comes into line with the said opening in said centering member, whereby said member can be withdrawn from said plunger only after the latter is removed from said support following the withdrawal of said first mentioned locking pin, a vertical cap magazine having a feeding passage at its lower end for the travel of caps to a position beneath said plunger, a vertical rock shaft, an operating arm at its upper end, a cap feeding blade secured to the lower end of said shaft and operative to feed caps from the lower end of said magazine to proper position beneath said plunger, a spring for holding said rock shaft in a limiting position, and a cam for engaging said operating arm to move said shaft against the force of said spring, said shaft being vertically movable with said centering member, whereby said member, magazine, shaft, spring and plunger may be moved from said support and then said plunger from said member, magazine and other parts, all for cleaning purposes.

14. In a bottle capper, a support, a depending plunger removably secured at its upper end to said support, a bottle centering member sleeved on said plunger and vertically movable thereon, a pin and slot connection between said plunger and centering member, a vertical cap magazine having a feeding passage at its lower end for the travel of caps to a position beneath said plunger, a vertical rock shaft, an operating arm at its upper end, a cap feeding blade secured to the lower end of said shaft and operative to feed caps from the lower end of said magazine to proper position beneath said plunger, a spring for holding said rock shaft in a limiting position, and a cam for engaging said operating arm to move said shaft against the force of said spring, said shaft being vertically movable with said centering member, whereby said member, magazine, shaft, spring and plunger may be moved from said support and then said plunger from said member, magazine and other parts, all for cleaning purposes.

15. In a bottle capper, a supporting base, a tubular standard secured to said base and extending upward therefrom, a rotary base journaled to rotate about said standard, vertically movable bottle lifters positioned on said rotary base about said standard, pneumatic connections and associated means responsive to air pressures to move said lifters up and down relative to said rotary base, a head above said rotary base, a connecting tube surrounding said standard and fixed at its bottom to said rotary base and at its top to said head, said connecting tube and head having a splined connection allowing a relative vertical adjustment of said head upon said tube but requiring a unitary rotation of said head and tube, a central rod extending upward through and beyond said standard, a sleeve about said tube forming an upward extension of said head, a swivel bearing between said central rod and sleeve, a hood secured to the top of said central rod and fitting down over said sleeve, a cam member secured to said hood and having an outer peripheral cam surface, capper elements carried by said head in alignment with said lifters respectively, said elements including a rock shaft having an arm for engaging said cam surface so as to be operated thereby as said head rotates, means for shifting said rod up and down to raise and lower said head relative to said rotary base, and means for rotating said head and base in timed relation to the up and down movements of said bottle lifters.

16. In a bottle capper, a supporting base, a tubular standard secured to said base and extending upward therefrom, a rotary bottle carrying base journaled to rotate about said standard, vertically movable bottle lifters positioned on said rotary base about said standard, means for moving said lifters up and down relative to said rotary base, a head above said rotary base, a tube surrounding said standard and secured at its bottom to said rotary base, and at its top to said head, said tube and head having a splined connection allowing a relative vertical adjustment of said head on said tube but requiring a unitary rotation of said head and tube, a central rod extending upward through and beyond said tubular standard, a sleeve about said tube connected to said head and extending upward beyond said standard, a swivel bearing between said central rod and sleeve, means for shifting said rod up and down to raise and lower said head relative to said rotary base, capping elements carried by said head in alignment with said bottle lifters respectively, means for rotating said rotary base and head, and means cooperating between head and said central rod for actuating said capping elements as said head rotates.

17. In a bottle capper, a supporting base, a tubular standard secured to said base and extending upward therefrom, a rotary bottle carrying base journaled to rotate about said standard and having a series of positions for bottles arranged around said standard, a head above said rotary base secured to and rotatable with the same, said head being also vertically adjustable relative to said rotary base, a central rod extending upward through and beyond said tubular standard, a sleeve about the upper end of said standard forming an upward extension of said head, a swivel bearing between said rod and sleeve, means for shifting said rod up and down to raise and lower said head relative to said rotary base, capping elements carried by said head in alignment with said bottle lifters respectively, means for rotating said rotary base and head, and means cooperating between head and said central rod for actuating said capping elements as said head rotates.

18. In combination, a base rotatable about a vertical axis, pneumatically operated bottle lifters positioned about said axis upon said rotary base, said rotary base having a valve face on its under side provided with ports and associated passages leading to said lifters respectively, a bearing member having an upper valve face bearing against said first mentioned valve face and supporting said rotary base, said bearing member having groove ports in its upper face positioned to register during rotation with said lifter ports, one of said groove ports being open to atmosphere and another to a source of air under pressure, a fixed base, and a single point bearing for said bearing member whereby the same will readily adjust itself to bring the valve faces of said member and said rotary base into accurate and nice fit.

19. In combination, a base rotatable about a vertical axis, pneumatically operated bottle lifters positioned about said axis upon said rotary base, said rotary base having a valve face on its under side provided with ports and associated passages leading to said lifters respectively, a bearing member having an upper valve face bearing against said first mentioned valve face and supporting said rotary base, said bearing member having groove ports in its upper face positioned to register during rotation with said lifter ports, one of said groove ports being open to atmosphere and another to a source of air under pressure, a fixed base, and a bearing pin for said bearing member extending upward from said fixed base, and an adjusting screw threaded into said base and operative to raise and lower said pin.

20. In a bottle capper, a support having a vertical bore, a plunger having its upper end fitted into said bore and removably secured to said support, a bottle centering member sleeved on said plunger and vertically reciprocable thereon, a pin in said plunger and a slot in said centering member providing a pin and slot connection between said plunger and centering member, said pin being located in a transverse bore in said plunger and extending at one end through said slot and at the other end lying wholly within the lateral limits of said plunger, said pin by engagement with the upper end of said slot limiting the downward movement of said centering member and said centering member by engagement with said support limiting the upward movement of said member, all of which occurs when the parts are in assembled relation, and when said plunger and centering member are removed from said support but still assembled together, said pin by engagement with the lower end of said slot brings said pin into alignment with a hole in said centering member through which said pin may be removed from its bore and the centering member and plunger thus separated from each other for cleaning and like purposes.

21. In a bottle capper, a support having a vertical bore, a plunger having its upper end fitted into said bore, means for removably securing said plunger to said support in a set position, a bottle centering member sleeved on said plunger and vertically movable thereon from an upper limiting position wherein it engages said support to a lower bottle engaging position, a pin and slot connection between said plunger and centering member, the slot thereof being in said bottle centering member and of sufficient length to allow the full operating movement of said bottle centering member when said plunger is secured to said support and a movement in excess of said full operating movement when said plunger is disconnected from said support, and the pin of said connection being held by said bottle centering member against removal except when said member is disconnected from said support, said pin being headed and its head resting in a recess in said plunger during the connection of said plunger to said support and being free to pass through an opening in a wall of said bottle centering member, provided for the purpose, to enable said centering member to be removed from said plunger.

22. In a bottle capper, a support, a depending plunger removably secured at its upper end to said support, a bottle centering sleeve on said plunger vertically movable thereon, and a headed pin removably seated in a transverse bore in said plunger with its head in a recess on one side of the plunger and its distant end projecting beyond the other side of said plunger through a slot in said sleeve, said sleeve passing up and down freely on said plunger over the head of said pin head.

23. In a bottle capper, a support, a depending plunger removably secured at its upper end to said support, a bottle centering sleeve on said plunger vertically movable thereon, said sleeve having a lengthwise slot on one side and a small opening in its other side directly opposite said slot and in line with it, and a headed pin capable of passing through said opening and slot and through a transverse bore in said plunger while the latter is free from said support, said plunger having a recess at one end of said bore, which recess is adapted to receive the head of said pin, whereby said sleeve may be moved up and down on said plunger over the headed end of said pin.

24. In a bottle capper, a support, a depending plunger removably secured at its upper end to said support, a bottle centering sleeve on said plunger vertically movable thereon, said sleeve having a lengthwise slot on one side and a small opening in its other side directly opposite said slot and in line with it, and a headed pin capable of passing through said opening and slot and through a transverse bore in said plunger while the latter is free from said support, said plunger having a recess at one end of said bore, which recess is adapted to receive the head of said pin, whereby said sleeve may be moved up and down on said plunger over the headed end of said pin, the lengths of said plunger and sleeve being such that when the parts are assembled and said plunger secured to said support, said support will engage said sleeve to limit its upward movement before said pin comes in line with said opening.

25. A machine of the class described, comprising a base, bottle engaging capper heads, pneumatically operated bottle supports, a carrier for said supports, means for rotating said carrier together with said heads and supports respectively in alignment, one head in alignment with each support, said lifters being operative to bring the bottle mouths into operating contact with said heads, means associated with said heads for applying caps to the operatively positioned bottles while said bottles are so positioned, said bottle supports having in each case a bottle engaging member above an air chamber, said chamber being in communication with passages terminating in ports on the under bearing surface of said carrier, said base having a grooved passageway on its upper bearing surface for cooperation with said ports, means for dividing said passageway into segments, and means for variously connecting said segmental passages with a compressed air supply and to atmosphere to variously operate said bottle supports.

26. In a bottle capper, a base rotatable about a vertical axis, pneumatically operated bottle lifters positioned about said axis upon said rotary base, said base having a valve face on its under side provided with supply ports and associated passages for said lifters, a bearing member having an upper valve face bearing against said first mentioned valve face and supporting said rotary base, said bearing member having groove ports in its upper face positioned to register during rotation with said lifter ports, one of said groove ports being open to atmosphere, said bearing member also having communicating passages leading to others of said groove ports, connections for supplying air under different pressures to said communicating passages respectively whereby said lifters are subjected to different air pressures as their ports pass over said groove ports respectively, each said lifter including an upright standard, a cylindrical lifting member having a closed end constituting the bottle support and a skirted portion fitting over said standard, suitable packing about the upper end of said standard engaging the interior of the cylindrical wall of said member, the corresponding air passage in said rotary base communicating with the interior of said member above said standard, dash pot means acting between said lifting member and standard to retard the return of said member to normal following its elevation by compressed air, a head above said rotary base secured to and rotatable with said base, said head being vertically adjustable relative to said rotary base, capping elements carried by said head in alignment with said bottle lifters respectively, and means for operating said elements in response to rotations of said head, the lifters being differently elevated by the different air pressures and serving to force bottles thereon into different operative positions relative to said elements as the parts rotate.

27. In a bottle capper, a base rotatable about a vertical axis, pneumatically operated bottle lifters positioned about said axis upon said rotary base, said base having a valve face on its under side provided with supply ports and associated passages for said lifters, a bearing member having an upper valve face bearing against said first mentioned valve face and supporting said rotary base, said bearing member having groove ports in its upper face positioned to register during rotation with said lifter ports, one of said groove ports being open to atmosphere, connections for supplying air under pressure to another of said groove ports, the different ports and pressures being provided for different operations of said lifters, each said lifter including an upright standard, a cylindrical lifting member closely fitting over said standard with piston tightness, the corresponding air passage in said rotary base communicating with the interior of said lifting member, dash pot means acting between said lifting member and standard to retard the return of said member to normal following its elevation by compressed air, a head above said rotary base secured to and rotatable with said base, said head being vertically adjustable relative to said rotary base, capping elements carried by said head in alignment with said bottle lifters respectively, and means for operating said elements in response to rotations of said head, the lifters being differently elevated by the different air pressures and serving to force bottles thereon into different operative positions relative to said elements as the parts rotate.

LEWIS E. FAGAN.
ALBERT B. MOJONNIER.